United States Patent [19]

Johansson et al.

[11] Patent Number: 5,447,604
[45] Date of Patent: Sep. 5, 1995

[54] SILICA SOLS, A PROCESS FOR THE PRODUCTION OF SILICA SOLS AND USE OF THE SOLS

[75] Inventors: Hans E. Johansson, Kungälv; Bo V. Larsson, Partille, both of Sweden

[73] Assignee: Eka Nobel AB, Bohus, Sweden

[21] Appl. No.: 855,649

[22] PCT Filed: Oct. 24, 1990

[86] PCT No.: PCT/SE90/00690
§ 371 Date: May 8, 1992
§ 102(e) Date: May 8, 1992

[87] PCT Pub. No.: WO91/07351
PCT Pub. Date: May 30, 1991

[30] Foreign Application Priority Data

Nov. 9, 1989 [SE] Sweden .................. 8903754

[51] Int. Cl.$^6$ .................. D21H 17/69; B01J 13/06; C04B 14/04
[52] U.S. Cl. .................. 162/181.6; 106/482; 252/315.6; 162/168.3; 162/175; 162/183
[58] Field of Search .................. 106/482; 162/181.6, 162/168.3, 175, 183; 252/315.6

[56] References Cited

U.S. PATENT DOCUMENTS

| | | | |
|---|---|---|---|
| 3,533,816 | 10/1970 | Oken | 106/74 |
| 3,655,578 | 4/1972 | Yates | 252/313 |
| 4,385,961 | 5/1983 | Svending et al. | 162/175 |
| 4,388,150 | 6/1983 | Sunden et al. | 162/175 |
| 4,946,557 | 8/1990 | Svending | 162/164.6 |
| 5,098,448 | 3/1992 | Puppe et al. | 23/313 P |

FOREIGN PATENT DOCUMENTS

| | | |
|---|---|---|
| 0041056 | 12/1981 | European Pat. Off. |
| 0080986 | 6/1983 | European Pat. Off. |
| 0261820 | 3/1988 | European Pat. Off. |
| 0357574 | 3/1990 | European Pat. Off. |
| 63-45113 | 2/1988 | Japan . |
| 232270 | 2/1991 | New Zealand . |
| 232271 | 2/1991 | New Zealand . |
| 232272 | 2/1991 | New Zealand . |
| WO86/00100 | 1/1986 | WIPO . |
| WO86/05826 | 10/1986 | WIPO . |
| WO88/06659 | 9/1988 | WIPO . |
| WO8906637 | 7/1989 | WIPO . |

*Primary Examiner*—Mark L. Bell
*Assistant Examiner*—Scott Hertzog
*Attorney, Agent, or Firm*—Leydig, Voit & Mayer

[57] ABSTRACT

Silica sols which have a large alkali excess, i.e. a low molar ratio $SiO_2$ to $M_2O$, and which contain silica particles with a high specific surface area. The silica sols can be prepared through acidification of a water glass solution and subsequent alkalization of the acid sol to the molar ratio in question. The sols are particularly suitable for use as additives, in combination with cationic polymers, in papermaking.

14 Claims, No Drawings

SILICA SOLS, A PROCESS FOR THE PRODUCTION OF SILICA SOLS AND USE OF THE SOLS

The present invention relates to new silica sols, to a process suitable for the production of the sols and to the use of the new sols in the production of paper. More particularly the invention relates to new silica sols which have particles with a high specific surface area and which have a fairly low molar ratio $SiO_2$ to $M_2O$, ie a fairly high excess of alkali. The new sols are particularly suitable for use in the production of paper as additives in combination with cationic polymers.

Silica sols, which term is used herein for silica hydrosols, are aqueous systems with very small silica particles which can be used in several fields of application, among other things dependent on the particle size. At the production of paper silica based sols with anionic particles have gained an increased utilization during the last few years. The silica sols are here used as additives to the stock in combination with cationic polymers, primarily to increase retention and dewatering at papermaking. In the European patent 41056 is for example disclosed the use of colloidal silica sols in combination with cationic starch in the production of paper. It is stated in a general manner that the silica particles have a specific surface area within the range of from 50 to 1000 $m^2/g$. It is further generally stated for the sols that they have been stabilized with alkali to a molar ratio of $SiO_2$ to $M_2O$ of 10:1 to 300:1, and preferably to a ratio of 15:1 to 100:1. The at production of paper commercially used sols are of the type which have a colloidal particles with a particle size usually from about 4 to about 7 nm, ie a specific surface area of from about 700 to about 300 $m^2/g$ and above all sols with particles having a specific surface area of about 500 $m^2/g$ have been used commercially. It has generally been considered that sols with colloidal particles of the above given size have given the best results and they have also been preferred with regard to their stability. The commercial sols have usually had a molar ratio $SiO_2$ to $M_2O$ of about 40:1, ie they have been stabilized with smaller amounts of alkali. Attempts have been made, as evident from the mentioned European patent, to prepare silica sols with particles which have a high specific surface area. However, these have not been sufficiently stable to be used on a larger scale.

According to the present invention it has been found that silica sols with particles which have a high specific surface area are stable and that the high specific surface area can be maintained within a high range for sufficiently long times to enable commercial handling through the fact that the sols have a certain molar ratio $SiO_2$ to $M_2O$.

The present invention thus relates to new silica sols which are characteristic in that they contain particles which have a comparatively high specific surface area and in that they have a comparatively low molar ratio $SiO_2$ to $M_2O$ (where M stands for alkali metal ion and/or ammonium ion and M preferably means a sodium ion), ie a comparatively high alkali content. It has been found that these sols which contain anionic particles are useful at the production of paper and similar products and that they hereby, in combination with cationic polymers, give very good improvement of retention and dewatering. In addition to silica sols as defined in the appended claims the present invention also relates to a process for the production of silica sols and to the use of the sols, as defined in the appended claims.

As has been mentioned above, the present silica sols are characteristic in that the silica particles have a comparatively high specific surface area and this is within the range of from 700 to 1200 $m^2/g$. The given specific surface area has been measured by means of titration with NaOH according to the method described by Sears in Analytical Chemistry 28(1956):12, 1981–1983. The silica sols according to the invention are further characteristic in that they have a comparatively low molar ratio $SiO_2$ to $M_2O$, within the range of from 6:1 to 12:1, and suitably within the range of from 7:1 to 10:1. As the sols have the given molar ratio $SiO_2$ to $M_2O$, ie a large excess of alkali, they are stable both towards gelation and towards substantial decrease of the specific surface area for sufficiently long times so that they can be handled, transported and used in a commercial manner and this at concentrations which are suitable with regard to these aspects. The molar ratio must not be below 6:1 with regard to the risk for gelation which arises if this limit is passed. The limit 12:1 is essential for maintaining the high specific surface area of the particles. The present sols suitably have a dry substance content, calculated as $SiO_2$, of from about 3 to about 15 percent by weight, and they preferably have a dry substance content within the range of from 5 to 12 percent by weight.

The sols according to the invention can be prepared starting from conventional alkali water glasses, potassium or sodium water glass, preferably from sodium water glass. The mole ratio of $SiO_2$ to $Na_2O$ or $K_2O$, in the water glass can, as per se known, be within the range of from 1.5:1 to 4.5:1 and is preferably within the range of from 3.2:1 to 3.9:1. A diluted solution of the water glass is utilized and this suitably has an $SiO_2$ content of from about 3 to about 12 percent by weight, preferably from about 5 to about 10 percent by weight. The water glass solution which usually has a pH around 13, or above 13, is acidified to a pH of from about 1 to about 4. The acidification can be carried out in per se known manner by addition of mineral acids, such as for example sulfuric acid, hydrochloric acid and phosphoric acid or optionally with other known chemicals for acidification of water glass such as ammonium sulfate and carbon dioxide. However, it is preferred that the acidification is carried out by means of acid cation exchangers which among other things lead to more stable products and give almost sodium free acid sols. The acidification is preferably carried out by means of strongly acid cation exchange resin, for example of sulfonic acid type. It is preferred that the acidification is carried out to a pH of from about 2.0 to 4.0 and most preferably from about 2.2 to about 3.0. After acidification an alkalization of the acid sol is carried out to the given molar ratio $SiO_2$ to $M_2O$. The obtained sol will hereby normally get a pH value above 10.5. The alkalization can be carried out with conventional alkali such as sodium, potassium or ammonium hydroxide. It is, however, preferred that alkalization is carried out by addition of water glass. Potassium and sodium water glass, particularly sodium water glass, with a mole ratio of $SiO_2$ to $M_2O$ as above described is used in this alkalization step. The $SiO_2$ content in the water glass solution used for the alkalization is not critical but is decided with regard to the desired dry substance content. The $SiO_2$ content is suitably within the range of from about 5 to about 35 percent by weight and preferably within the range of from 10 to 30. The acid sol has particles with a high specific surface area, above 1000 m²/g and usually around 1300 m²/g. After the alkalization a particle growth starts and thus a decrease of the specific surface area. However, since the sols have the given molar ratio $SiO_2$ to $M_2O$ the surface area area will be stabilized within the given range after a fairly short period of time, about a week, and be stable within this range for longer times, at least two months. According to the process silica sols with dry contents of from about 3 to about 15 percent by weight, and suitably of from about 5 to about 12 percent by weight, can be prepared.

The new sols, with anionic particles, according to the invention are particularly suitable at the production of paper. The present invention also relates to this use of the sols. As mentioned by way of introduction it is well known to use silica based sols in combination with cationic polymers at the production of paper, primarily in order to improve retention and drainage. The present silica sols are used in corresponding manner as earlier known for silica sols with anionic particles and they give, in combination with cationic polymers, a substantial improvement of retention and dewatering at paper reproduction. Very good retention and dewatering results are obtained as a result of the high specific surface area of the sols. The improved dewatering also means that the speed of the paper machine can be increased and further that less water need to be dried off in the press and drying sections of the paper machine and an economically substantially improved paper production process is hereby obtained. The very much decreased sol dosage, calculated as $SiO_2$, required to obtain corresponding results as with commercial sols should be particularly mentioned.

The present invention thus also relates to a method for the production of paper having the characteristic features set out in the claims. As cationic polymer according to the invention such polymers which are conventionally used in paper production as retention and/or wet strength agent are suitable and they can be natural, ie based on carbohydrates, or synthetic. As examples of suitable cationic polymers can be mentioned cationic starch, cationic guar gum, cationic polyacrylamides, polyethyleneimines, polyamidoamines and poly(diallyldimethyl ammonium chloride). The cationic polymers can be used separately or in combination with each other. Preferred cationic polymers are cationic starch and cationic polyacrylamide. According to a particularly preferred embodiment the silica sols are used in combination with both cationic starch and cationic synthetic polymer and particularly then cationic polyacrylamide.

The amount of silica sol and cationic polymer at paper production according to the present invention can vary within wide limits depending among other things, on type of stock, presence of fillers and other conditions. The amount of sol should suitably be at least 0.01 kg/t, calculated as $SiO_2$ on dry fibers and optional fillers, and is suitably within the range of from 0.05 kg/ton to 5 kg/ton and preferably within the range of from 0.1 to 2 kg/ton. The sol is suitably added to the stock with dry contents within the range of from 0.1 to 5 percent by weight. The amount of cationic polymer is to a high degree dependent on the type of polymer and on other effects desired from the polymer. For synthetic cationic polymers usually at least 0.01 kg/ton is used, calculated as dry on dry fibers and optional fillers. Suitably amounts of from 0.01 to 3 and preferably of from 0.03 to 2 kg/ton are used. For cationic polymers based on carbohydrates such as cationic starch and cationic guar gum amounts of at least 0.1 kg/ton, calculated as dry on dry fibers and optional fillers, are usually used. For these polymers amounts of from 0.5 to 30 kg/ton are suitably used and preferably from 1 to 15 kg/ton. The weight ratio of cationic polymer to sol calculated as $SiO_2$ should suitably be at least 0.01:1 and suitably at least 0.2:1. The upper limit for cationic polymer is primarily a question of economy and of charge. For polymers with lower cationicity such as cationic starch, alone or in combination with other cationic polymers, very high amounts can thus be used, up to a ratio of 100:1 and higher, and the limit is mainly decided with regard to economy. For most systems suitable ratios cationic polymer to sol, calculated as $SiO_2$, is within the range of from 0.2:1 to 100:1. When the silica sol is used together with a combination of cationic starch and cationic synthetic polymer, and preferably cationic polyacrylamide, the weight ratio between the two latter is suitably within the range of from 0.5:1 to 200:1 and preferably within the range of from 2:1 to 100:1. The present silica sols can of course be used in the production of paper in combination with paper chemicals which are conventional in papermaking such as hydrophobing agents, dry strength agents, wet strength agents etc. It is particularly suitable to utilize aluminum compounds in combination with the present sols and cationic polymers since it has been found that aluminum compounds can give an additional improvement of retention and dewatering. Any aluminum compound per se known for use in papermaking can be utilized, eg alum, polyaluminum compounds, aluminates, aluminum chloride and aluminum nitrate. Also the amount of aluminum compound can vary within wide limits and it is suitable to use the aluminum compound in a weight ratio to the sol, calculated as $SiO_2$, of at least 0.01:1, whereby the aluminum compound has been calculated as $Al_2O_3$. The ratio should suitably not exceed 3:1 and is preferably within the range of from 0.02:1 to 1.5:1. The polyaluminum compounds can for example be polyaluminum chlorides, polyaluminum sulfates, and polyaluminum compounds containing both chloride and sulfate ions. The polyaluminum compounds may also contain other anions than chloride ions, for example anions from sulfuric acid, phosphoric acid, organic acids such as citric acid and oxalic acid.

The silica sols and the cationic polymers can be utilized at the production of paper from different kinds of stocks of cellulose containing fibers and the stocks should suitably contain at least 50 percent by weight of such fibers, calculated on dry material. The components can for example be used as additives to stocks from fibers from chemical pulp, such as sulphate and sulphite pulp, thermo-mechanical pulp, refiner mechanical pulp or groundwood pulp, from as well hardwood as softwood and can also be used for stocks based on recycled fibers. The stocks can also contain mineral fillers of conventional types such as kaolin, titanium dioxide, gypsum, chalk and talcum. The terms paper and paper production which are used herein do of course include not only paper but also other cellulose fiber containing products in sheet or web form, such as pulp sheets, board and paper board and their production.

The sols can be utilized within a wide pH range at paper production. The best effects are, however, obtained under neutral or alkaline conditions. It is thus preferred that the sol are utilized in paper production where the pH of the stock is 6 or higher. Even if any order of addition can be used it is preferred that the cationic polymer is added before the sol. If both cationic starch and cationic synthetic polymer are used it is preferred that they are added in this order.

The present invention is further illustrated in the following examples which, however, are not intended to limit the same. Parts and percent relate to parts by weight and percent by weight, respectively, unless otherwise stated.

EXAMPLE 1A–1C

In these examples the preparation of the new sols is described.

Example 1A 5000 g of a water glass solution with a molar ratio $SiO_2$ to $Na_2O$ of 3.49:1 and an $SiO_2$ content of 5.75% was ion exchanged by pumping it through a column filled with cationic ion exchange resin Amberlite IR-120.

To 1000 g of the obtained acid sol with an $SiO_2$ content of 5.58% 146 g of a water glass solution with a molar ratio of 3.49:1 and an $SiO_2$ content of 24.8% were added under stirring.

The obtained sol A had a final molar ratio $SiO_2$ to $Na_2O$ of 8.8:1 and the specific surface area of the particles, measured after a week, was 1010 $mg^2/g$. The sol was stable towards gelation for several months. The specific surface area of the particles was measured after about 1 month and was then about 920 $m^2/g$. When measured after about 2 months the specific surface areas was still as high as 875 $m^2/g$.

Example 1B

A water glass solution was ion exchanged in a column according to Example 1A so that an acid sol with an $SiO_2$ content of 4.84% was obtained. To 900 kg of the acid sol 97.5 kg of a water glass solution with an $SiO_2$ content of 24.8% and a molar ratio $SiO_2$ to $Na_2O$ of 3.49 were added.

The obtained sol B had a final molar ratio $SiO_2$ to $Na_2O$ of 9.8:1 and the particles specific surface area, measured after 1 week, was 980 $m^2/g$.

Example 1C

A water glass solution was ion exchanged in a column to an acid sol having an $SiO_2$ content of 4.71%. To 500 g portions of this acid sol varying amounts of water glass with an $SiO_2$ content of 22.8% and $Na_2O$ content of 6.5% were added. In the Table below the specific surface area for the sols, measured one week after the preparation, and the final molar ratio $SiO_2$ to $Na_2O$ in the sols are shown.

| Sol | Amount of waterglass g | Specific surface area $m^2/g$ | Molar ratio $SiO_2:Na_2O$ |
| --- | --- | --- | --- |
| C1 | 55 | 960 | 10.1 |
| C2 | 65 | 1020 | 9.1 |
| C3 | 75 | 1060 | 8.3 |
| C4 | 90 | 1120 | 7.5 |
| C5 | 100 | 1145 | 7.1 |
| C6 | 120 | 1175 | 6.5 |

EXAMPLE 2a)–2d)

In the following tests the new sols were evaluated in the production of paper in combination with cationic polymers.

The dewatering effect was evaluated in a Canadian Standard Freeness (CSF) Tester according to SCAN-C 21:65. Additions of chemicals were made to a Britt Dynamic Drainage Jar with blocked outlet at 800 rpm for 45 seconds and the stock system was then transferred to the freeness tester. The dewatering results are given as ml CSF.

Example 2a

In this example the dewatering effect of sols A and B was investigated. The stock was a mixture of 60% bleached birch sulfate and 40% bleached pine sulfate. 30% of chalk were added to the stock as filler and a stock with a concentration of 3 g/l was then prepared and to this 1 g/l of $Na_2SO_4.10H_2O$ was added. The pH of the stock was 7.5 and its CSF value was 310 ml. As cationic polymer in the tests cationic starch which had a degree of substitution of 0.04 was used and added in amount of 5 kg/ton, based on dry fibers and fillers. When solely cationic starch was added in an amount of 5 kg/ton a CSF value of 360 ml was obtained. In the tests shown below the cationic starch was added before the sol. As a comparison a commercial silica sol as disclosed in the European patent 41056 which had a specific surface area of 500 $m^2/g$ and molar ratio $SiO_2$ to $Na_2O$ of about 40:1 was used.

| Sol A kg/t | Sol B kg/t | Commercial sol kg/t | CSF ml |
| --- | --- | --- | --- |
| 0.25 | | | 460 |
| 0.5 | | | 490 |
| 0.75 | | | 495 |
| | 0.25 | | 425 |
| | 0.5 | | 455 |
| | 0.75 | | 470 |
| | | 0.25 | 390 |
| | | 0.5 | 420 |
| | | 0.75 | 435 |

As evident either a higher effect can be obtained at the same dosage or a much lower dosage can be used to obtain the same results as with the commercial sol. The values shown in the Table relate to sol A and B as after storage for one week. After two months storage the sols gave corresponding improvements in comparison with the commercial sol.

Example 2b

In this example the effect of sol A in combination with a number of different cationic polymers was investigated. The cationic polymers were: cationic guar gum with a degree of substitution of about 0.12 (GUAR), cationic polyacrylamide with medium high charge and high molecular weight (PAM) and cationic poly(diallyldimethyl ammonium chloride) (Poly(DADMAC)). The same type of stock as in Example 2a) was used. However, the original CSF value for the stock was 255 ml. The cationic polymer was in all tests added to the stock before the sol. A comparison with the same commercial sol as in Example 2A was also made.

| GUAR kg/t | PAM kg/t | Poly(DADMAC) kg/t | Sol A kg/t | Commercial sol kg/t | CSF ml |
| --- | --- | --- | --- | --- | --- |
| 2.5 | | | | | 310 |
| 2.5 | | | 0.75 | | 375 |
| 2.5 | | | 1.0 | | 400 |
| 2.5 | | | | 0.75 | 335 |
| 2.5 | | | | 1.0 | 350 |
| | 0.5 | | | | 330 |
| | 0.5 | | 0.75 | | 415 |
| | 0.5 | | 1.0 | | 435 |
| | 0.5 | | 1.5 | | 430 |
| | 0.5 | | | 0.75 | 350 |

-continued

| GUAR kg/t | PAM kg/t | Poly(DADMAC) kg/t | Sol A kg/t | Commercial sol kg/t | CSF ml |
|---|---|---|---|---|---|
|  | 0.5 |  |  | 1.0 | 360 |
|  | 0.5 |  |  | 1.5 | 375 |
|  |  | 0.25 |  |  | 270 |
|  |  | 0.25 | 1.0 |  | 335 |
|  |  | 0.25 |  | 1.0 | 295 |

Example 2c)

In this example the dewatering effect of sols C1 to C6 in combination with cationic starch was investigated. The stock was a groundwood stock with a concentration of 3 g/l and a pH of 8.6. The cationic polymer was added before the sol and the sols were about one week old at the tests. Without addition of chemicals the stock had a freeness value of 180 ml. With addition of solely 7 kg/t of cationic starch the freeness value was 265 ml. When 7 kg of cationic starch and 1 kg of sol, the amounts being calculated as dry on 1 ton of dry fibers, were used the following results were obtained.

Cationic starch+Sol C1: 320 ml CSF
Cationic starch+Sol C2: 323 ml CSF
Cationic starch+Sol C3: 323 ml CSF
Cationic starch+Sol C4: 325 ml CSF
Cationic starch+Sol C5: 330 ml CSF
Cationic starch+Sol C6: 340 ml CSF To the same groundwood stock as above 0.2 kg/t of a cationic polyacrylamide were added and a freeness value of 225 ml was then obtained. When the corresponding amount of cationic polyacrylamide was used in combination with 1.0 kg/t of sol C2 a freeness value of 235 was obtained and when a combination of cationic starch (7 kg/t), cationic polyacrylamide (0.2 kg/t) and sol C2 (1.0 kg/t) were used the freeness value was 390.

Example 2d

In this example retention properties were evaluated by means of a Britt Dynamic Drainage Jar at 800 rpm. This is the conventional test method for retention in paper industry.

The stock was made up from 60% bleached birch sulfate and 40% bleached pine sulfate. 30% of chalk were added to the stock as filler and it was then diluted to a concentration of 5 g/l. Then 1 g/l of $Na_2SO_4 \cdot 10H_2O$ was added. The stock had a fines fraction of 37.2% and a pH of 7.5.

The sol (C4) used in these retention tests was sol C4 according to Example 1C. The dosage order for the chemicals was cationic polymer followed by silica sol. In the test when both cationic starch (CS) and cationic polyacrylamide (PAM) were used these were added in this order. Comparisons with the same commercial sol as in Example 2A was also made. The results are shown below.

| Test No. | CS kg/t | PAM kg/t | Sol C4 kg/t | Commercial sol kg/t | Retention % |
|---|---|---|---|---|---|
| 1 | 8 | — | — | — | 43.5 |
| 2 | 8 | — | — | 0.75 | 72.0 |
| 3 | 8 | — | — | 1.0 | 78.0 |
| 4 | 8 | — | 0.75 | — | 81.8 |
| 5 | 8 | — | 1.0 | — | 84.7 |
| 6 | 8 | 0.3 | 1.0 | — | 92.2 |

We claim:

1. A process for producing paper, comprising the steps of forming a suspension of cellulose-containing fibers, adding to the suspension a cationic polymer and an anionic silica sol, forming a layer of paper from the suspension and dewatering the paper on a wire, wherein the silica sol has a molar ratio SiO to $M_2O$ of from 6:1 to 12:1, M being an alkali metal ion or an ammonium ion, and wherein the sol contains silica particles having a specific surface area within the range of from 700 to 1200 $m^2/g$.

2. A process according to claim 1, wherein the sol has a molar ratio $SiO_2$ to $M_2O$ within the range of from 7:1 to 10:1.

3. A process according to claim 1, wherein the cationic polymer is cationic starch or cationic polyacrylamide.

4. A process according to claim 2, wherein the cationic polymer is cationic starch or cationic polyacrylamide.

5. A process according to claim 1, wherein the cationic polymer comprises cationic starch and a cationic synthetic polymer.

6. A process according to claim 2, wherein the cationic polymer comprises cationic starch and a cationic synthetic polymer.

7. A process according to claim 5, wherein the cationic synthetic polymer is cationic polyacrylamide.

8. A process according to claim 6, wherein the cationic synthetic polymer is cationic polyacrylamide.

9. A process according to claim 1, wherein the sol is added in an amount of at least 0.01 kg/ton, calculated as $SiO_2$ on dry fibers and optional fillers.

10. A process according to claim 2, wherein the sol is added in an amount of at least 0.01 kg/ton, calculated as $SiO_2$ on dry fibers and optional fillers.

11. A process according to claim 9, wherein the sol is added in an amount of from 0.05 to 5 kg/ton, calculated as $SiO_2$ on dry fibers and optional fillers.

12. A process according to claim 10, wherein the sol is added in an amount of from 0.05 to 5 kg/ton, calculated as $SiO_2$ on dry fibers and optional fillers.

13. A process according to claim 1, wherein the weight ratio of cationic polymer to sol, calculated as $SiO_2$, is within the range of from 0.2:1 to 100:1.

14. A process according to claim 2, wherein the weight ratio of cationic polymer to sol, calculated as $SiO_2$, is within the range of from 0.2:1 to 100:1.

* * * * *